Patented Aug. 7, 1928.

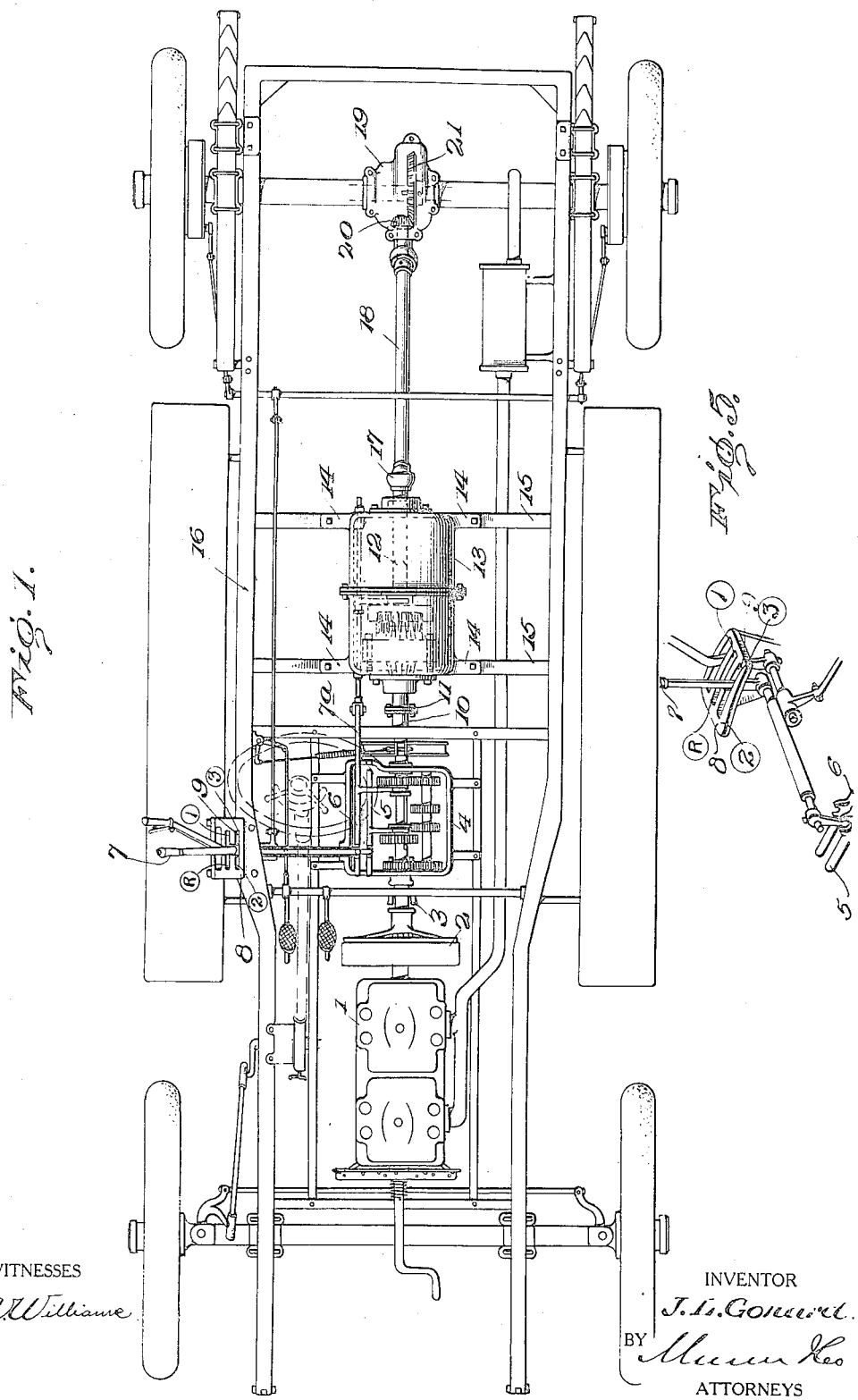

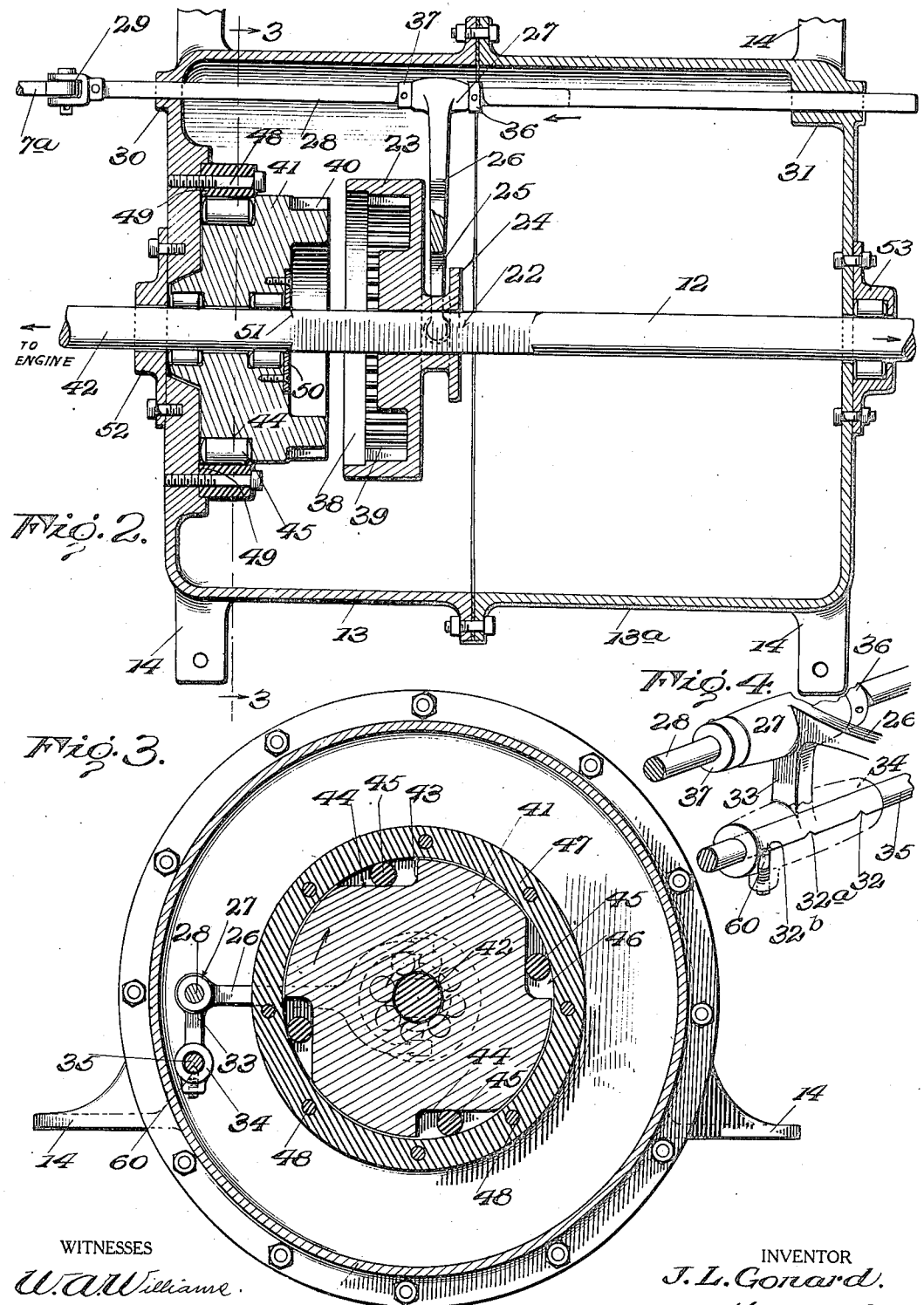

1,680,148

UNITED STATES PATENT OFFICE.

JOHN LOUIS GONARD, OF ENGLEWOOD CLIFFS, NEW JERSEY, ASSIGNOR, BY MESNE ASSIGNMENTS, TO KANT-BACK CORPORATION, A CORPORATION OF NEW JERSEY.

DEVICE FOR PREVENTING RETROGRADE MOVEMENT.

Application filed July 25, 1924. Serial No. 728,219.

This invention relates to a device for preventing retrograde movements of a vehicle and has for its object the provision of a device which will automatically lock the running gear of an automobile to prevent backward movement of the automobile when the same has been stopped on an inclined roadbed.

A further object of the invention is the provision of a device which will prevent retrograde movement of an automobile by locking the driving elements connected with the rear wheels against rearward movement but permitting the automobile to be reversed under the power of the engine.

A further object of the invention is the provision of a device which will prevent retrograde movement of an automobile when the automobile is on an incline and when the clutch has been thrown out but which will automatically release the locking means when the reversing gear has been thrown into operation.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of an automobile showing a locking means for the rear portion of the running gear of an automobile and constructed in accordance with the principles of my invention.

Figure 2 is a horizontal section of the locking device shown in Figure 1.

Figure 3 is a vertical section taken along the line 3—3 of Figure 2 and at right angles to the section of Figure 2.

Figure 4 is a fragmentary view in perspective of a shifter arm for the clutch element of the locking device.

Figure 5 is a fragmentary enlarged view showing the connection between the shifter rod and the shifting lever.

Referring more particularly to the drawings, 1 designates the power plant of an automobile having a fly wheel 2 and a clutch element 3. A transmission casing 4 has the usual shafts and transmission gears and shifter rods 5 and 6 slidably mounted in the transmission casing with the shifter rod 6 having an extension $7^a$ projecting rearwardly from the casing 4. A shifting lever 7 is adapted to be oscillated for shifting either of the rods 5 or 6 as the case may be and is controlled in its movements by means of a plate 8 having a gate slot 9 through which the lever is moved. It will be seen that the ends of the slot are marked with "reverse" "first" "second" and "third" speeds, with the shifting lever shown in the neutral slot in Figure 1.

A drive shaft 10 has a flanged connection 11 with a short shaft 12 mounted for rotation within a casing 13. This casing is secured by means of straps 14 and transverse bars 15 connected with the frame 16 of the automobile. A universal joint 17 connects the shaft 12 with the drive shaft 18 which terminates in the differential housing 19 and is provided with a spur gear 20 adapted to mesh with the master gear 21 of the differential.

Referring more particularly to Figures 2 and 3, the short shaft 12 has its opposite ends cylindrical in formation with a central portion 22 square in cross section upon which is slidably mounted a clutch mechanism 23. This clutch has a square central opening adapted to slide on the squared portion 22 and is also provided with a grooved sleeve 24 adapted to receive the inwardly projecting ends of a fork 25. This fork has an arm 26 and a sleeve 27 slidable upon a rod 28 which has a universal connection as shown at 29 with the extension $7^a$ of the shifter rod 6. Rod 28 is slidable in an opening in a boss 30 on the casing 13 and in a bearing 31 formed integrally with the casing $13^a$.

The sleeve 27 has a depending arm 33 which is provided at its free end with a sleeve 34 adapted to receive a guide rod 35. The rod 35 has its opposite ends fastened to the casing, the collar 34 being slidable on said rod. Rod 35 is provided with a plurality of notches 32, $32^a$ and $32^b$ respectively representing the positions of the reverse, neutral and first speeds as determined by the shifting lever 7. A spring pressed pawl 60 mounted in a boss on the collar 34 is adapted to engage the notches.

When the spring pressed pawl is engaged in the central notch 32ª, the shifter lever 7 will be in neutral position. When the pawl is located in notch 32, the shifter lever will have been moved to reverse position, but when the pawl is in engagement with the notch 32ᵇ, the shifter lever will have been moved to first speed, so that rod 28 will be held against accidental shifting when the clutch member 23 has been placed in a predetermined position.

The rod 28 carries a collar 36 which is adapted to engage one end of the sleeve 27 for moving said sleeve and the yoke 25 in the direction indicated by the arrow while a collar 37 is pinned to the rod 28 and is adapted to engage the opposite end of said sleeve and move the sleeve and the yoke 25 in the opposite direction.

The clutch member 23 is provided with a recess 38 and internal teeth 39 adapted to engage the external teeth 40 on a second clutch member 41 which is loose upon the cylindrical portion 42 of the shaft 12, so that the shaft when ordinarily driven revolves within the member 41. The periphery of the member 41, as shown more particularly in Figure 3 is provided with notches 43 having inclined faces 44 upon which is mounted a roller 45. The clutch member 23 is normally thrown into engagement with the clutch member 41 so that when the member 41 is rotated in a direction which is opposite to that indicated by the arrow in Figure 3, the roller 45 will fall into the deepest portion 46 of the pocket or notch 43. The periphery of the member 41 is in engagement with the inner periphery of a braking ring 47 which is secured by means of bolts 48 to the inner face 49 of the casing 13. When the member 41 is rotated through the clutch member 23 by the shaft 12 the rollers 45 will ride upon the inclined surfaces 44 of the pockets 43 and be wedged in between the inclined portion 44 and the periphery of the ring 47 and lock the clutch against movement. When the member 41 is revolved in the opposite direction the rollers 45 will fall into the deepest portions 46 of the pockets 43 and permit the member 41 to be revolved with the shaft without any interference.

A ring member 50 is secured to the clutch member 41 within the recess in the inner face of the clutch member and is adapted to engage the shoulder 51 of the shaft 12 where the squared portion 22 merges into the round portion 42 and aids in maintaining the clutch member 41 in its position with relation to the braking ring 47.

The casing 13 is made up of a plurality of sections which are bolted together. The casing is adapted to be filled with oil and glands 52 and 53 are secured to the outer end of the casing where the shaft 12 projects through the same in order to prevent loss of oil from said casing.

The operation of my device is as follows:

Whenever the shifting lever 7 is in neutral position the clutch member 23 is in engagement with the clutch member 41 and the member 41 is locked for simultaneous rotation with shaft 12. With the clutch of the automobile so thrown out while the same is on an inclined roadbed the automobile would tend to move rearwardly and the clutch member 41 would be caused to be rotated by the shaft 12 through the rear wheels in the direction indicated by the arrow in Figure 3 so that the inclined surface of the pocket 43 would jam the rollers 45 into the inner periphery of the braking ring 47 and lock the member 41 and shaft 12 against reverse rotation and thereby preventing further movement of the wheels. It will be seen that the automobile will be held against retrograde movement whenever the automobile is on an inclined roadbed and when the shifting lever is located in neutral position. This is also true when the shifting lever has been moved to first, second or third speeds. In other words the member 23 will lock the shaft 12 to member 41 at all times except when the shifter has been moved to reverse position.

Referring more particularly to Figure 1 it will be seen that when the shifting lever is moved in the gate slots marked 2 and 3 the lower end of the shifting lever will have been moved to a position where it does not engage the notch in the shifting rod 6 since it has been moved over into engagement with the notch or grooved plate carried by the shifter rod 5. The shifter rod 6, together with its extension 7ª and the operating rod 28 will remain idle. When the shifting lever 7 has been moved to the reverse position, the shifter rod 6, the extension 7ª, and the rod 28, connected to the extension 7ª are moved rearwardly and the collar 37 will engage one end of sleeve 27 and move the yoke 25 rearwardly carrying with it the clutch member 23 whereby the clutch member has been released from the clutch member 41.

When the shifting lever 7 is moved from reverse towards first speed the collar 36 will engage the sleeve 27 and move the yoke 25 and the clutch member 23 inwardly to cause the same to engage the clutch member 41. It will be seen by this construction that the rear wheels are always locked against reverse movement when the automobile is on an incline to prevent rearward movement of the automobile but will be automatically unlocked when the shifting lever has been moved for placing the transmission gears into position for reversing.

It will be appreciated that in the mechanism shown and described more particularly in Figure 2 for automatically locking the rear wheels against movement to prevent retrograde movement of the automobile the same form of mechanism may be employed in a section 13ª of the casing 13 but reversely positioned on shaft 12 for manually locking, when desired, the wheels against forward movement so that the device may also act as a braking mechanism when the car is being driven forwardly.

What I claim is:

1. In a vehicle, a drive shaft, a shifting lever, a shifter rod operated by the shifting lever for causing a reverse rotation of the drive shaft, and means connected with the shifter rod for locking the shaft against rotation in one direction and adapted to be actuated by the shifter rod when the same has been moved for reverse rotation of the shaft to release said means, said means comprising a rod connected with the shifter rod, an arm mounted on said rod, a guide rod, a depending portion provided with a sleeve connected with the said arm, the sleeve being slidable on the guide rod, and means for automatically locking the sleeve in a plurality of different positions, means on the rod connected with the shifter rod for engaging the arm and moving the same in opposite directions, a braking element mounted on the drive shaft, a clutch on the drive shaft adapted to normally engage the braking element to permit rotation of the shaft in one direction and prevent rotation in the opposite direction, said arm being connected with the clutch element and adapted to move in or out of engagement with the braking element when the shifter rod is moved to position the reversing gears of the vehicle.

2. In a vehicle having rear wheels for propelling said vehicle, the combination of a drive shaft operatively connected with said wheels of the vehicle, a transmission, a shifter rod for the transmission, a casing fixed to the vehicle, said shaft passing through the casing, a braking ring secured within the casing, a disc loose upon the shaft and provided with a plurality of pockets at the periphery thereof, rollers mounted in the pockets, said pockets having a reduced portion adapted to force the rollers into engagement with the brake ring when the disc is revolved in one direction for locking the shaft against rotation, said pockets having enlarged portions adapted to receive the rollers when the disc is revolved in the opposite direction and thereby maintain the rollers out of engagement with the brake ring, means for locking the disc to the shaft and comprising a clutch element carried by the disc, and a clutch element driven by the shaft adapted to be moved in operative engagement with the clutch element on the disc, and means connecting the shifter rod with the second mentioned clutch element, whereby the second mentioned clutch element may be moved into operative engagement with the first mentioned clutch element.

3. In a vehicle, a drive shaft, a shifting lever, a shifter rod, operated by the shifting lever, means connected with the shifter rod for locking the shaft against rotation in one direction and adapted to be actuated by the shifter rod to release said means, said means comprising an operating rod connected with the shifter rod, an arm mounted on said operating rod, a guide rod, a depending portion provided with a sleeve connected with said arm, the sleeve being slidable on the guide rod, means on the operating rod for engaging the arm and moving the same in opposite directions, a combined clutch element and braking means loose on the shaft, a braking ring adapted to be engaged by the braking means, a second clutch element for engaging the first mentioned clutch element, and operatively connected with the arm so that when the arm is shifted, the second mentioned clutch element will be moved into or out of operative engagement with the first mentioned clutch element.

JOHN LOUIS GONARD.